2,846,365

HYDROFORMING CATALYST CONTAINING A GROUP VI METAL OXIDE SUPPORTED ON A ZINC-ZIRCONIUM ALUMINATE SPINEL

Elroy Merle Gladrow, Baton Rouge, La., assignor to Esso Research and Engineering Company, a corporation of Delaware No Drawing. Application December 29, 1954
Serial No. 478,511

4 Claims. (Cl. 196—50)

The present invention pertains to catalysts and particularly to improved catalysts for use in the reforming or hydroforming of motor gasoline boiling range hydrocarbons or naphtha to form motor fuels of excellent antiknock and engine cleanliness characteristics.

A large number of compositions have been proposed as catalysts for the hydroforming or upgrading of motor fuel or naphtha fractions by treatment at elevated pressures of up to about 1000 lbs. per sq. inch, at temperatures of about 750°–1050° F. and in the presence of rather large amounts of hydrogen or hydrogen-rich recycle gas. Among those employed or suggested for use in hydroforming have been the heavy metal oxides, such as molybdenum, chromium, tungsten and vanadium oxides generally supported on a base or spacing agent. The most commonly used of these has been molybdenum oxide upon an alumina-containing adsorptive base such as activated alumina, alumina gel or the like.

It has also been proposed to disperse molybdenum oxide and other hydroforming catalyst components upon zinc aluminate spinel supports. This type of support is prepared by combining aluminum oxide with zinc oxide, preferably in molecular proportions thereby forming active chemical compounds of the spinel type. A particular advantage of the zinc aluminate spinel supported catalysts has been their improved stability to heat. In addition, these catalysts have been found to have a particularly favorable selectivity pattern as shown by their ability to give excellent yields of products of high aromatic content or low aniline point value.

It has been found, however, that the hydroforming performance of zinc aluminate base type catalyst is adversely affected by operating in the presence of even small amounts of water. As a result of this sensitivity to water, the zinc aluminate base catalysts are not practical for use in continuous fluid hydroforming operations. In such continuous operation, steam is commonly used to strip spent catalyst preparatory to regeneration. Water is formed in the burning of residual hydrogen as well as of coke in the regenerator. Further quantities of water are formed in the reduction of $MoO_3$, the state of the catalytic metal oxide leaving the regenerator, to $MoO_2$ or $Mo_2O_5$, or mixtures thereof, the catalytically active form, in a pretreatment step outside the reaction zone or directly in the reaction zone. Moreover, with cooling water at ambient temperatures the recycling gas normally retains substantial quantities of water which is carried into the reaction zone. Obviously, in such continuous fluid operations, the catalyst composition must not be adversely affected by water under hydroforming reaction conditions.

It is the object of this invention to prepare novel zinc aluminate spinel base hydroforming catalyst compositions.

It is also the object of this invention to prepare novel zinc aluminate spinel base hydroforming catalysts which are not adversely affected by the presence of water or water vapor in the hydroforming reaction zone.

These and other objects will appear more clearly from the detailed specification and claims which follow.

It has now been found that zinc aluminate spinel supported hydroforming catalysts are stabilized against the adverse effects of water by the addition of small amounts of zirconia thereto. The zirconia in the form of a solution of a soluble salt may be added to the zinc aluminate while the latter is in the form of a hydrogel or hydrous oxide mixture or in the form of a dry powder or microspheres as produced by spray drying the hydrous oxide mixture. Also, the zirconia may be used to replace some of the zinc oxide in the preparation of the spinel base.

The zinc aluminate spinel may be prepared in various ways. For example, the hydrous zinc aluminate may be prepared by adding a zinc salt such as zinc sulfate or zinc nitrate to sodium aluminate or by the various other methods disclosed in Kearby U. S. Patent No. 2,447,017, dated August 17, 1948. Alternatively, the hydrous zinc aluminate may be prepared by adding a soluble zinc salt to an alumina hydrosol or by hydrolyzing aluminum alcoholate with a heat decomposable zinc salt such as zinc acetate. It is preferred that the zinc aluminate comprises aluminum oxide and zinc oxide in equal molecular proportions, although a slight excess of either of these constituents is not harmful.

The zirconia is added to the zinc aluminate in the form of a solution of a soluble zirconium salt such as zirconyl nitrate, zirconyl sulfate, zirconyl acetate or the like. The zinc aluminate may be in the form of a hydrogel or hydrous oxide mixture as freshly formed or precipitated or it may be in the form of a dry powder or microspheres as obtained by spray drying the hydrous oxide mixture. In this case, the solution of the zirconyl compound is added as in a wet impregnation. The zirconia in the form of a soluble salt, such as zirconyl nitrate, sulfate or acetate, may be dissolved in proper proportion in the zinc salt solution and the mixed solution combined with alumina hydrosol or sodium aluminate. The zirconyl compound is added to the zinc aluminate in sufficient amount to incorporate about 0.5 to 10% by weight of zirconia ($ZrO_2$) based upon the zinc aluminate ($ZnO.Al_2O_3$). Instead of adding zirconia to the zinc aluminate, zirconia may be used to replace some of the zinc oxide in the base. In the latter case the amount of zirconia used may be in the range of 1 to 20 mol percent, preferably, 2 to 10 mol percent based upon the alumina content.

After wet impregnation of the zinc aluminate by the solution of the zirconyl compound or after the preparation of the hydrous oxide-zirconyl oxide-aluminum oxide complex, the composition is dried and calcined at temperatures of from 650° to 1400° F. for from 6 to 16 hours to form the spinel.

If desired, the active catalyst component, for example, the molybdenum oxide-yielding solution, such as ammonium molybdate, may be added simultaneously with the zirconyl-compound or before the final drying step, or the catalytic component may be incorporated in the dried and calcined zirconia-modified zinc aluminate spinel. The amount of molybdic oxide incorporated in the catalyst may vary from about 4 to 16 wt. percent, but is preferably about 11 wt. percent based upon the spinel. Other metal oxides may be used as the active catalytic component, such as chromic oxide, vanadium oxide, tungsten oxide, cobalt molybdate and the like. The amounts of these catalytic components provided in the fluid catalyst composition is subject to considerable variation. These catalytic components can be applied in any manner well known in the art and in the same amounts customarily used on other supports or carriers.

Catalysts produced in accordance with the present invention are especially valuable for the reforming or hydroforming of hydrocarbon fractions boiling between 125° and 450° F., i. e., in the motor gasoline or naphtha boiling range. While virgin naphtha is the preferred feed stock, other naphthas, such as cracked naphtha, coker naphtha, Fischer-Tropsch naphtha or mixtures of two or more of these may be used. Reforming is normally effected at temperatures of from about 800° to 1050° F., preferably, at about 900° F., and at pressures of from about 50 to 750 lbs. per sq. inch. Hydrogen-rich gas, preferably recycle gas formed in the process, is supplied to the reaction zone in amounts of from about 1000 to 8000 cu. ft. per barrel of naphtha feed in order to minimize coke deposition upon the catalyst.

Weight ratio of catalyst to oil introduced into the reactor should ordinarily be about 0.5 to 3.5 and is preferably about 1.0. Space velocities of the weight in pounds of feed charged per hour per pound of catalyst in the reactor depends upon its age or activity level of the catalyst, the character of the feed stock and the desired octane number of the product, and may vary from about 0.15 w./hr./w. to about 1.5 w./hr./w.

Regeneration of the used catalyst is effected by burning carbonaceous deposits therefrom at temperatures between about 1000° and 1200° F. at essentially the same pressure as is maintained in the reforming reaction, or if convenient or desired, at a lower pressure. Ordinarily, the regenerated catalyst is given a pretreatment or partial reduction by contacting with hydrogen or other reducing gas prior to placing the same on stream again in the hydroforming process. In fluid solids operations, the regenerated catalyst may be returned to the reactor dense bed without contact with hydrogen or other reducing gas, in which event, partial reduction of the catalyst takes place at reactor conditions.

To better demonstrate this invention, there are set forth below several specific examples which are intended to illustrate only and are not intended to restrict the scope of this invention.

EXAMPLE 1

An alumina hydrosol is prepared by the alcoholate method as follows. Fifty-four pounds of aluminum metal in the form of ⅜ inch chunks are dissolved in about 124 gallons of a 50/50 mixture of mixed amyl alcohols and petroleum naphtha boiling in the range of about 200° to 300° F. About 0.1 ounce of mercuric chloride is used as a catalyst for the reaction between aluminum and the amyl alcohol. It is necessary to heat the mixture to start the reaction between the metal and the alcohol, but after the reaction is started, cooling is necessary. After the reaction is complete, the solution of aluminum amylate is hydrolyzed by mixing with a solution of 4 gallons of acetic acid in about 396 gallons of water a temperature of about 80° F. The hydrolyzed mixture is allowed to settle into an upper layer of regenerated amyl alcohol and petroleum naphtha and a lower layer of alumina sol. The latter is withdrawn and stripped of its small content of dissolved and entrained amyl alcohol and naphtha by blowing with steam. The resulting alumina hydrosol comprises about 2.9% alumina. The regenerated amyl alcohol and naphtha mixture is dried by distillation for reuse. The hydrosol is designated alumina sol "A."

A solution of zinc acetate is prepared by dissolving sufficient zinc acetate in water to raise the specific gravity of the solution to 1.150. A solution of this gravity (at room temperatures) has an equivalent ZnO content of about 1.46 lbs. ZnO per gallon of solution. About 20 gallons of the zinc acetate solution were prepared and is designated solution "B."

A solution of zirconyl nitrate is prepared by dissolving 2.1 pounds of $ZrO(NO_3)_2 \cdot 2H_2O$ in sufficient water to make 2 gallons of solution. This is equivalent to about 0.483 pounds $ZrO_2$ per gallon. This solution is designated as solution "C."

Ten gallons of alumina sol "A" are placed in a mixing vessel and blended with 1.33 gallons of zinc acetate solution "B." The mixture is left to stand at room temperature for three days, oven dried, and then calcined for 16 hours at 650° F. Four pounds of the calcined base are impregnated with sufficient ammonium molybdate solution to give 10% $MoO_3$ on the final dried catalyst. This catalyst is designated catalyst "D" and comprises 10% $MoO_3$ on $ZnO$—$Al_2O_3$.

EXAMPLE 2

Ten gallons of alumina sol "A" are placed in a mixing vessel and blended with 1.33 gallons of zinc acetate soluiton "B," and 0.224 gallon of zirconyl nitrate solution "C." The mixture is left to stand for three days at room temperature and then oven dried, followed by calcining 16 hours at 650° F. Four pounds of the calcined base are impregnated with sufficient ammonium molybdate solution to give 10% $MoO_3$ on the final dried catalyst. This catalyst comprises 10% $MoO_3$ on a base containing about 2% $ZrO_2$ on $Al_2O_3$—$ZnO$ and is designated catalyst "E."

EXAMPLE 3

Ten gallons of alumina sol "A" are placed in a mixing vessel and blended with 1.19 gallons of zinc acetate solution "B" and 0.576 gallon of zirconyl nitrate solution "C." The mixture is left to stand at room temperature for three days and then oven dried, followed by calcining 16 hours at 650° F. The calcined base (4 pounds) is impregnated with sufficient ammonium molybdate solution to give 10% $MoO_3$ on final dried catalyst. This catalyst comprises 10% $MoO_3$ on a base having a molar composition of 0.1 mol $ZrO_2$—0.9 mol $ZnO$—1.0 mol $Al_2O_3$. This catalyst is designated catalyst "F."

EXAMPLE 4

Catalysts "D," "E," and "F" described in Examples 1, 2 and 3 are made into 3/16 inch by 3/16 inch cylindrical pellets. These catalysts are individually employed in a fixed catalyst bed operation for the hydroforming of a 200° to 330° F. boiling range virgin naphtha from mixed Southeast and West Texas crudes. The conditions employed are 910° F. temperature, 50 p. s. i. g. pressure and 2000 cugic feet of added hydrogen per barrel of naphtha feed. Each catalyst was tested under "dry" conditions in which the naphtha and hydrogen feed streams were pre-dried to remove traces of water. Each catalyst was also tested under "wet" conditions which consisted of adding 2.5 mol percent water to the hydrogen gas stream. The hydroforming yield of $C_6+$ product and the feed rate (weight of feed per weight of catalyst per hours necessary to give 0° F. aniline point for the $C_6+$ product for each catalyst) are shown in the following table:

*Table I*

| Catalyst | Operation | At 0° F. Aniline Point ||
|---|---|---|---|
| | | $C_6+$ Yield | W./Hr./W. |
| "D" | Dry | 65 | 0.50 |
| | Wet | 64 | 0.39 |
| "E" | Dry | 74 | 0.40 |
| | Wet | 74 | 0.33 |
| "F" | Dry | 77 | 0.28 |
| | Wet | 77 | 0.24 |

These data show that catalyst "E" and "F" which contain zirconia suffer no loss in selectivity due to wet operation and relatively less loss in activity during wet opera tion compared to zirconia-free catalyst "D." The add tion of zirconia also markedly improves the yield of $C_6$ liquid product over catalyst "D."

The foregoing description contains a limited numb of embodiments of the present invention. It will understood that this invention is not restricted there since numerous variations are possible without departi from the scope of this invention.

What is claimed is:

1. A hydroforming catalyst consisting essentially of molybdic oxide dispersed upon a zinc aluminate spinel support, said support containing 0.5 to 10 wt. percent zirconia to stabilize the catalyst against the adverse effects of water.

2. A process of hydroforming hydrocarbon fractions which comprises contacting the hydrocarbons in admixture with hydrogen under hydroforming conditions of temperature, pressure and contact times with a hydroforming catalyst consisting essentially of molybdic oxide dispersed upon a zinc aluminate spinel support, said support containing 0.5 to 10 wt. percent zirconia to stabilize the catalyst against the adverse effects of water.

3. A process of hydroforming hydrocarbon fractions which comprises contacting the hydrocarbons in admixture with hydrogen under hydroforming conditions of temperature, pressure and contact times with a hydroforming catalyst consisting essentially of a group VI metal oxide dispersed upon a zinc-zirconium aluminate spinel support, said support containing 1 to 20 mol percent zirconia and 99 to 80 mol percent zinc oxide based upon the alumina.

4. A process of hydroforming hydrocarbon fractions which comprises contacting the hydrocarbons in admixture with hydrogen under hydroforming conditions of temperature, pressure and contact times with a hydroforming catalyst consisting essentially of molybdenum oxide on a zinc-zirconium aluminate spinel support said support having a molar composition of 0.1 mol zirconia—0.9 mol zinc oxide and 1 mol $Al_2O_3$.

References Cited in the file of this patent

UNITED STATES PATENTS

| | | |
|---|---|---|
| 2,424,636 | Smith | July 29, 1947 |
| 2,424,637 | Smith | July 29, 1947 |
| 2,447,043 | Welty et al. | Aug. 17, 1948 |
| 2,608,534 | Fleck | Aug. 26, 1952 |
| 2,668,142 | Strecker | Feb. 2, 1954 |
| 2,692,257 | Zletz | Oct. 19, 1954 |